US008577287B2

(12) United States Patent
Seo et al.

(10) Patent No.: US 8,577,287 B2
(45) Date of Patent: Nov. 5, 2013

(54) TRANSMISSION DIVERSITY SCHEME OF MULTIPLE CELL COOPERATIVE COMMUNICATIONS

(75) Inventors: Bangwon Seo, Daejeon (KR); Young Jo Ko, Daejeon (KR); Jae Young Ahn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 172 days.

(21) Appl. No.: 13/062,344

(22) PCT Filed: Sep. 10, 2009

(86) PCT No.: PCT/KR2009/005135
§ 371 (c)(1),
(2), (4) Date: Mar. 4, 2011

(87) PCT Pub. No.: WO2010/030124
PCT Pub. Date: Mar. 18, 2010

(65) Prior Publication Data
US 2011/0195662 A1 Aug. 11, 2011

(30) Foreign Application Priority Data
Sep. 10, 2008 (KR) .................. 10-2008-0089081
Aug. 26, 2009 (KR) .................. 10-2009-0079200

(51) Int. Cl.
*H04B 7/24* (2006.01)

(52) U.S. Cl.
USPC .............. 455/39; 455/72; 455/517; 375/267; 375/219

(58) Field of Classification Search
USPC .............. 455/39, 73, 517, 561; 375/219, 267
See application file for complete search history.

(56) References Cited

U.S. PATENT DOCUMENTS

| 7,026,991 B2 * | 4/2006 | Hamada et al. ............... 342/442 |
| 7,079,593 B2 * | 7/2006 | Nakao et al. ................... 375/316 |
| 7,428,268 B2 * | 9/2008 | Shen et al. .................... 375/267 |
| 7,809,074 B2 * | 10/2010 | Kotecha et al. ............... 375/267 |

FOREIGN PATENT DOCUMENTS

KR 10-2007-0086976 8/2007

* cited by examiner

*Primary Examiner* — Tuan H Nguyen
(74) *Attorney, Agent, or Firm* — Nelson Mullins Riley & Scarborough LLP (57) ABSTRACT

Provided is a method of applying a transmission diversity scheme in a multiple cell cooperative communication system in which a terminal may receive, from a plurality of base stations, identical data using an identical radio resource. In the method, base stations of a cooperative base station involved in a cooperative communication may apply the transmission diversity scheme using the same resource as time and frequency resources used to apply the transmission diversity scheme in a base station of a serving base station.

8 Claims, 6 Drawing Sheets

| i | ANTENNA PORT 1 $x_1(i)$ | ANTENNA PORT 2 $x_2(i)$ | ANTENNA PORT 3 $x_3(i)$ | ANTENNA PORT 4 $x_4(i)$ |
|---|---|---|---|---|
| 1 | $s_1$ | $s_2$ | 0 | 0 |
| 2 | $-s_2^*$ | $s_1^*$ | 0 | 0 |
| 3 | 0 | 0 | $s_3$ | $s_4$ |
| 4 | 0 | 0 | $-s_4^*$ | $s_3^*$ |
| 5 | $s_5$ | $s_6$ | 0 | 0 |
| 6 | $-s_6^*$ | $s_5^*$ | 0 | 0 |
| 7 | 0 | 0 | $s_7$ | $s_8$ |
| 8 | 0 | 0 | $-s_8^*$ | $s_7^*$ |
| ⋮ | ⋮ | ⋮ | ⋮ | ⋮ |

Fig. 3

| i | ANTENNA PORT 1 $x_1(i)$ | ANTENNA PORT 2 $x_2(i)$ | ANTENNA PORT 3 $x_3(i)$ | ANTENNA PORT 4 $x_4(i)$ |
|---|---|---|---|---|
| 1 | $s_1$ | $s_2$ | 0 | 0 |
| 2 | $-s_2^*$ | $s_1^*$ | 0 | 0 |
| 3 | 0 | 0 | $s_3$ | $s_4$ |
| 4 | 0 | 0 | $-s_4^*$ | $s_3^*$ |
| 5 | $s_5$ | 0 | $s_6$ | 0 |
| 6 | $-s_6^*$ | 0 | $s_5^*$ | 0 |
| 7 | 0 | $s_7$ | 0 | $s_8$ |
| 8 | 0 | $-s_8^*$ | 0 | $s_7^*$ |
| 9 | $s_9$ | 0 | 0 | $s_{10}$ |
| 10 | $-s_{10}^*$ | 0 | 0 | $s_9^*$ |
| 11 | 0 | $s_{11}$ | $s_{12}$ | 0 |
| 12 | 0 | $-s_{12}^*$ | $s_{11}^*$ | 0 |
| ⋮ | ⋮ | ⋮ | ⋮ | ⋮ |

TRANSMISSION DIVERSITY SCHEME OF MULTIPLE CELL COOPERATIVE COMMUNICATIONS

RELATED APPLICATIONS

This application is a 35 U.S.C. §371 national stage filing of PCT Application No. PCT/KR2009/005135 filed on Sep. 10, 2009, which claims priority to, and the benefit of, Korean Patent Application No. 10-2008-0089081 filed Sep. 10, 2008 and Korean Patent Application No. 10-2009-0079200 filed Aug. 26, 2009. The contents of the aforementioned applications are hereby incorporated by reference.

TECHNICAL FIELD

The present invention relates to a method of applying a transmission diversity scheme in a multiple cell cooperative communication system in which a terminal may receive, from a plurality of base stations, identical data using an identical radio resource.

BACKGROUND ART

A general transmission diversity scheme may denote that a base station of a specific cell may transmit data using a plurality of antennas. However, in a case of a terminal located in a boundary of a cell, it is difficult to obtain a satisfactory performance only using the transmission diversity scheme due to interference signals from other cells.

As one method of solving the above described problem, multiple cell cooperative communications may be adapted. That is, in a multiple cell cooperative communication system, a terminal may receive, from a plurality of base stations, identical data using an identical radio resource.

The transmission diversity scheme used in the multiple cell cooperative communication system may have various characters in comparison with a transmission diversity scheme adapted in an existing single cell.

DISCLOSURE OF INVENTION

Technical Problem

An aspect of the present invention improves a throughput of a terminal located in a cell boundary.

Another aspect of the present invention also improves an average throughput of terminals located within a cell coverage.

Solution to Problem

According to an aspect of the present invention, there is provided a base station, including: a data precoding unit to precode transmission data to generate a first data vector; and a transmission unit to transmit the first data vector to a terminal using a transmission radio resource, wherein a cooperative base station with respect to the base station precodes the transmission data to generate the first data vector, converts a phase of the first data vector to generate a second data vector, and transmits the second data vector to the terminal using the transmission radio resource, and the terminal simultaneously receives the first data vector and the second data vector, and decodes the transmission data using the received first data vector and the received second data vector.

According to another aspect of the present invention, there is provided a cooperative base station with respect to a serving base station transmitting a first data vector to a terminal, the cooperative base station including: a data precoding unit to precode transmission data to generate a first data vector; a phase conversion unit to convert a phase of the first data vector to generate a second data vector; and a transmission unit to transmit, to the terminal, the second data vector having the converted phase using a transmission radio resource, wherein the first data vector is generated by precoding the transmission data, the serving base station transmits the first data vector to the terminal using the transmission radio resource, and the terminal simultaneously receives the first data vector and the second data vector having the converted phase, and decodes the transmission data using the received first data vector and the received second data vector.

According to still another aspect of the present invention, there is provided a terminal connected with a serving base station, the terminal including: a receiving unit to receive, from the serving base station, a first data vector generated based on transmission data, and to receive, from a cooperative base station, a second data vector generated by converting a phase of the first data vector; and a data decoding unit to decode the transmission data using the received first data vector and the received second data vector.

Advantageous Effects of Invention

According to embodiments of the present invention, a throughput of a terminal located in a cell boundary may be improved.

Also, according to embodiments of the present invention, an average throughput of terminals locate within a cell coverage may be improved.

MODE FOR THE INVENTION

Reference will now be made in detail to embodiments of the present invention, examples of which are illustrated in the accompanying drawings, wherein like reference numerals refer to the like elements throughout. The embodiments are described below in order to explain the present invention by referring to the figures.

The term "multiple cell cooperative transmission/receiving scheme" used herein may not be limited to a typical cell. Although being hereinafter described as "cell" for ease of description, the "cell" may include a sector and various structures. Also, "base station" used herein may not be limited to a typical base station. Although being hereinafter described as "base station" for ease of description, the "base station" may include a relay node and a node having a similar structure. The base station may be denoted as being connected with a backbone network in a wired manner, and a relay may be denoted as being connected with the backbone network after being connected with another base station in a wireless manner. Also, the base station used herein may include a node connected with the backbone network after being connected with another base station in a wired manner.

That is, "multiple cell cooperative communication scheme" used herein may be applicable in various types such as a cooperative communication of typical base stations, a cooperative communication of relay nodes, a cooperative communication of typical base stations and relay nodes, and the like.

A communication between base stations may be needed for the cooperative communication. The communication between base stations may be performed using a backbone network connected with a network, a private line directly connecting between the base stations, or wireless communication between the base stations.

In a case of the wireless communication between the base stations, as a radio resource used in the communication, a part of a frequency band used in a communication between the base station and a terminal or another frequency band separate from the frequency band used in the communication between the base station and the terminal may be used.

"Antenna port" used herein may be a logical antenna number used before being mapped into a physical antenna. That is, in a case where a transmission antenna port is mapped into a physical antenna port as is, a signal transmitted to a transmission antenna port m may be denoted as being transmitted using an actual physical transmission antenna m, however, the above-described mapping may be possible using a different method. For example, a transmission antenna port 1 may be mapped into a physical transmission antenna 4, and a transmission antenna port 2 may be mapped into a physical transmission antenna 3. In a more complicated manner, the mapping of the transmission antenna port and the physical transmission antenna may be performed using a multiplication of a matrix.

With respect to an arbitrary terminal, a base station involving the terminal may be referred to as a serving base station, and base stations that transmit data to the terminal using multiple cell cooperative communications although the terminal is not involved in the base station may be referred to as a cooperative base station. In this instance, the cooperative base station may be a single base station, or several base stations. The above described terminal may be referred to as a serving terminal.

When the terminal is connected with a first base station, the first base station may transmit, to peripheral second base stations, a control signal asking to join in the multiple cell cooperative communications. In this case, the first base station may be the serving base station with respect to the terminal, and the peripheral second base stations may be a cooperative base station with respect to the terminal. The serving base station may transmit in advance, to the cooperative base station, data intended to be sent to the terminal using the backbone network or a backhaul.

Hereinafter, only a case where the cooperative base station is a single one in Equations of the present invention may be described for ease of description, however, a plurality of base stations may be also used.

Hereinafter, embodiments of the present invention will be described in detail with reference to drawings.

Figure 1:
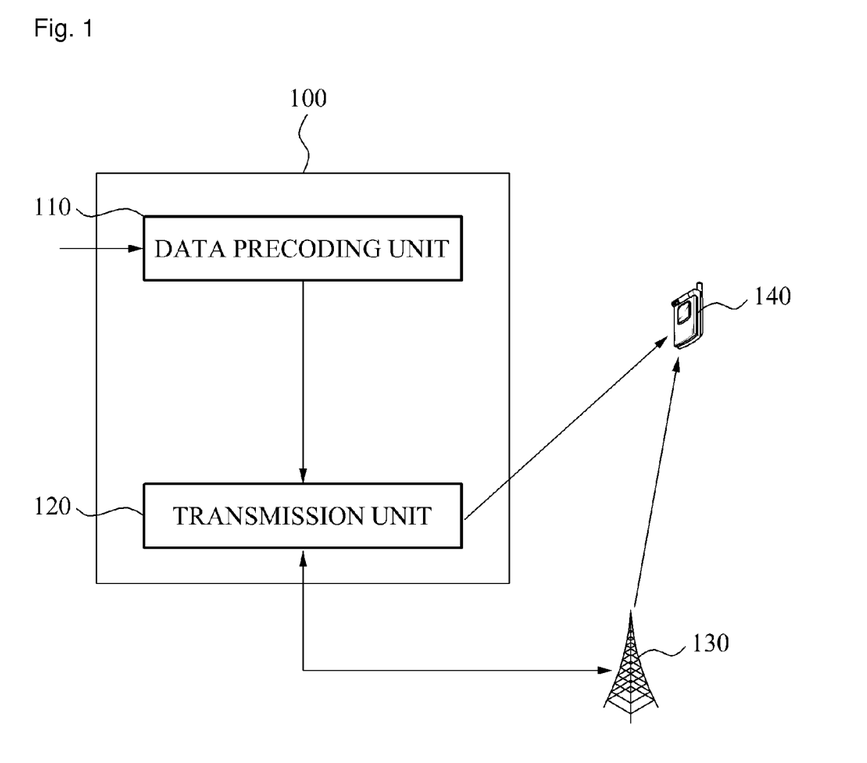
FIG. 1 is a block diagram illustrating a structure of a serving base station according to an embodiment of the present invention.

FIG. 1 is a block diagram illustrating a structure of a serving base station according to an embodiment of the present invention.

The data precoding unit 110 may precode transmission data to generate a first data vector. According to an embodiment of the present invention, the data precoding unit 110 may precode the transmission data using at least one of a space-time coding scheme and a space-frequency coding scheme.

Results of the precoding using the space-time coding scheme or the space-frequency coding scheme will be described in detail with reference to FIGS. 2 to 3.

The transmission unit 120 may transmit, to a terminal, the first data vector using a transmission radio resource. The transmission radio resource may include a specific time duration or a specific frequency band.

The cooperative base station 130 may be located in a periphery of the serving base station. Accordingly, a terminal 140 located outside of a coverage, from among terminals connected with the serving base station, may receive signals from the cooperative base station 130 as well as a serving base station 100.

The cooperative base station 130 may precode the transmission data to generate the first data vector. Also, the cooperative base station 130 may convert a phase of the first data vector to generate a second data vector, and transmit the generated second data vector to the terminal 140. In this instance, the cooperative base station 130 may transmit the generated second data vector to the terminal 140 using a transmission radio resource.

The cooperative base station according to an embodiment of the present invention may convert the phase of the second data vector into another phase for each predetermined duration with respect to at least one of a time and a frequency to thereby generate the second data vector.

The serving base station 100 and the cooperative base station 130 may transmit the first data vector and the second data vector to the terminal 140 using an identical radio resource. The radio resource may include a time duration or a frequency band. The terminal 140 may simultaneously receive the first data vector and the second data vector using the identical radio resource, and decode the transmission data using the received first data vector and second data vector.

The first data vector transmitted by the serving base station 100 may be transmitted to the terminal 140 via a first radio channel between the serving base station 100 and the terminal 140. Also, the second data vector transmitted by the cooperative base station 130 may be transmitted to the terminal 140 via a second radio channel between the cooperative base station 130 and the terminal 140. Each of the first and second data vectors may be phase-converted while passing through each of the first and second radio channels.

Because of the phase-conversion of each data vector in the respective base station 100 and 130 and the phase-conversion of each data vector in the respective radio channels, a concept of an effective channel may be considered. That is, a phase-conversion value in the effective channel may be the sum of a phase-conversion value in the respective base stations 100 and 130 and a phase-conversion value in the respective radio channels.

Even in a case where the phase-conversion values of the data vectors in the respective base stations 100 and 130 are different from each other, the phase-conversion values in the respective effective channels are the same as each other when the phase-conversion values of the data vectors in the respective radio channels being different from each other.

Accordingly, the first data vector and the second data vector may be received from the terminal 140 with an identical phase.

Since the phase-conversion of the radio channel may be relatively slow, the phase-conversion of the cooperative base station may be relatively fast. In this case, the phase-conversion values of the radio channels in a first resource duration and a second resource duration may show almost no difference, however, the phase-conversion values of the cooperative base stations 130 in the first resource duration and the second resource duration may show a great difference.

The cooperative base station 130 may convert the phase of the second data vector into another phase for each predetermined duration with respect to at least one of a time and a frequency. The phase-conversion values in the effective channel of the first data vector and the second data vector, in the first resource duration, may be different from each other. When the phase-conversion values of the first data vector and the second data vector are different from each other, and when a difference between a phase of the first data vector and a phase of the second data vector is 180 degrees, the first data vector and the second data vector may destruct each other, and the terminal 140 may not receive data.

The cooperative base station 130 may randomly convert the phase of the second data vector for each predetermined duration with respect to at least one of the time and the frequency. When the phase-conversion values of the cooperative base station in the first resource duration and the second resource duration are different from each other, the phase-conversion values of the first data vector and the second data vector may be the same as each other. The first data vector and the second data vector in the second resource duration may construct each other and be received, and the terminal 140 may receive data.

Accordingly, when the terminal 140 receives data during a consecutive resource duration (denoted as at least one of the time and the frequency), a transmission failure probability with respect to every consecutive data may be reduced. The terminal 140 may receive data in success in at least one resource duration included in the consecutive resource duration. When the terminal 140 uses an error correction coding scheme such as a channel coding and the like, data of which the reception has ended in failure may be restored based on data of which the reception has ended in success.

The cooperative base station 130 according to embodiments of the present invention may convert the phase of the second data vector regardless of the phase-conversion value of the radio channel. Accordingly, the terminal 140 may not need to feed back the phase-conversion value of the radio channel to the cooperative base station.

When the terminal 140 locates in a cell boundary or a moving speed is significantly rapid, a channel inference of the terminal 140 may be inaccurate. In this case, the phase-conversion value of the radio channel referred by the terminal may not be used by the serving base station 100 or the cooperative base station 130.

According to embodiments of the present invention, even when the phase-conversion value of the radio channel may not be used by the serving base station 100 or the cooperative base station 130, the terminal 140 may receive data using a multiple cell cooperative communication.

Figure 2:
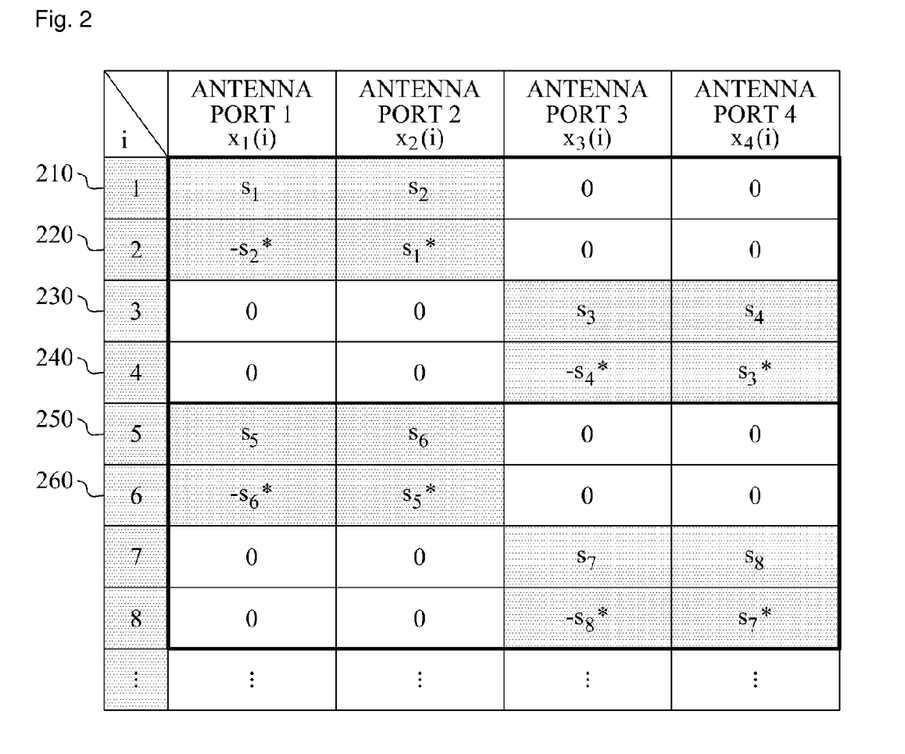
FIG. 2 is a diagram illustrating a space-time coding scheme or a space-frequency coding scheme according to an embodiment of the present invention.

FIG. 2 is a diagram illustrating a space-time coding scheme or a space-frequency coding scheme according to an embodiment of the present invention. Hereinafter, it is assumed that each base station includes four antenna ports in FIGS. 2 and 3.

In FIG. 2, i may denote a symbol index, and $s_1, s_2, s_3, \ldots$ may denote a data symbol in which a modulation scheme is applied, such as a Quardrature Amplitude Modulation (QAM), a Phase-shift Keying (PSK), an Amplitude-Shift Keying (ASK), and the like.

$x_m(i)$ may denote an element with respect to an m-th transmission antenna port from among a data vector precoded using a predetermined precoding scheme such as an Alamouti precoding scheme.

In FIG. 2, a vertical-axis index may denote a radio resource index, and the radio resource index may denote at least one of a time and a frequency. In a first resource duration 210 and a second resource duration 220, the Alamouti precoding scheme may be applicable with respect to transmission data $S_1$ and $S_2$.

The precoded transmission data $S_1$ and $S_2$ may be transmitted using an antenna port 1 or an antenna port 2. In a third resource duration 230 and a fourth resource duration 240, transmission data $S_3$ and $S_4$ may be encoded, and transmitted using an antenna port 3 and an antenna port 4, respectively.

In FIG. 2, an exemplary embodiment in which the transmission data is transmitted using a pair of the antenna ports 1 and 2 and another pair of antenna ports 3 and 4, similar to a case using two antenna ports, is illustrated.

However, in illustrated exemplary embodiments of FIG. 2, since the antenna port 1 and the antenna port 2 may always make one pair, and the antenna port 3 and the antenna port 4 may always make one pair, a little damage may occur in light of a diversity order. That is, to maximize the diversity order, all antenna ports are required to evenly make one pair.

Figure 3:
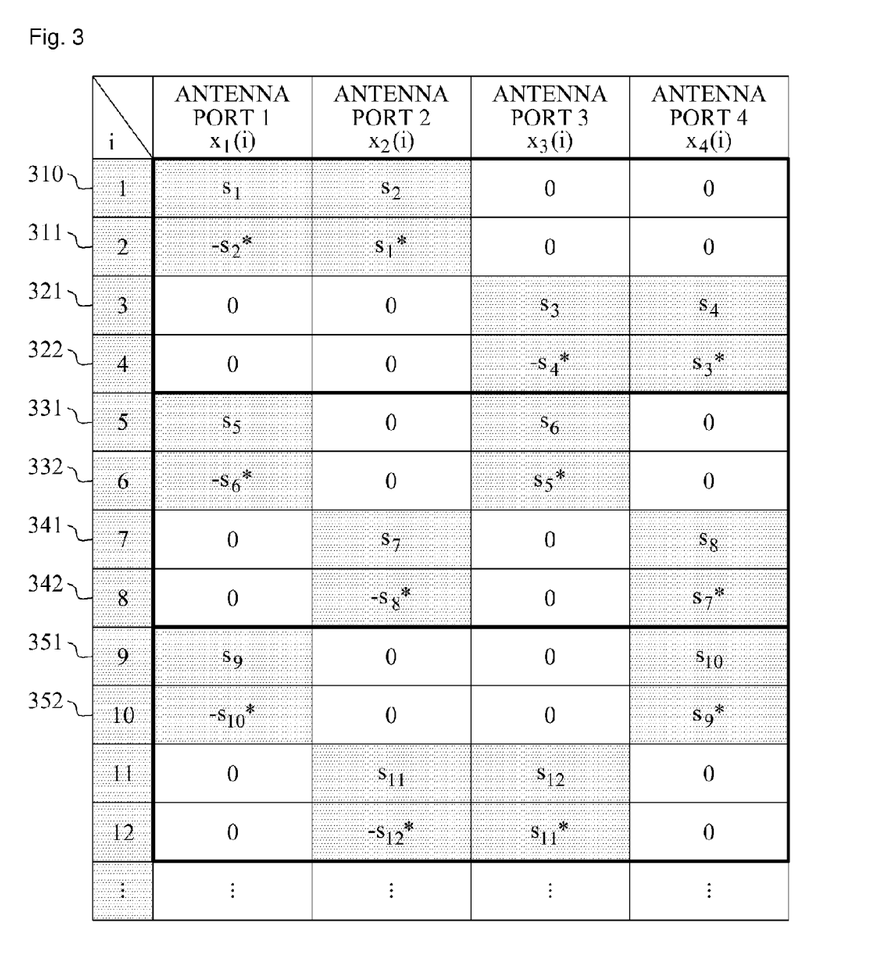
FIG. 3 is a diagram illustrating a space-time coding scheme or a space-frequency coding scheme according to another embodiment of the present invention.

FIG. 3 is a diagram illustrating a space-time coding scheme or a space-frequency coding scheme according to another embodiment of the present invention.

In a first resource duration 310 and a second resource duration 311 of FIG. 3, transmission data $S_1$ and $S_2$ may be precoded, and transmitted using an antenna port 1 and an antenna port 2.

In a third resource duration 321 and a fourth resource duration 322 of FIG. 3, transmission data $S_3$ and $S_4$ may be precoded, and transmitted using an antenna port 3 and an antenna port 4.

In a fifth resource duration 331 and a sixth resource duration 332 of FIG. 3, transmission data $S_5$ and $S_6$ may be precoded, and transmitted using the antenna port 1 and the antenna port 3.

That is, in the fifth resource duration 331 and the sixth resource duration 332, the antenna port 1 and the antenna port 3 may make one pair, and in a seventh resource duration 341 and an eighth resource duration 342 of FIG. 3, the antenna port 2 and the antenna port 4 may make one pair, thereby transmitting the transmission data.

As the resource index varies, a combination of a pair of the antenna ports may vary, and thereby a diversity gain may increase.

In FIG. 3, an exemplary embodiment in which a vertical index divides each of the time durations is illustrated. However, the radio resource according to embodiment of the present invention may denote the frequency band as well as the time duration. In this case, the present invention may be applicable even in an exemplary embodiment in which the vertical index divides the frequency band in a similar manner.

Figure 4:
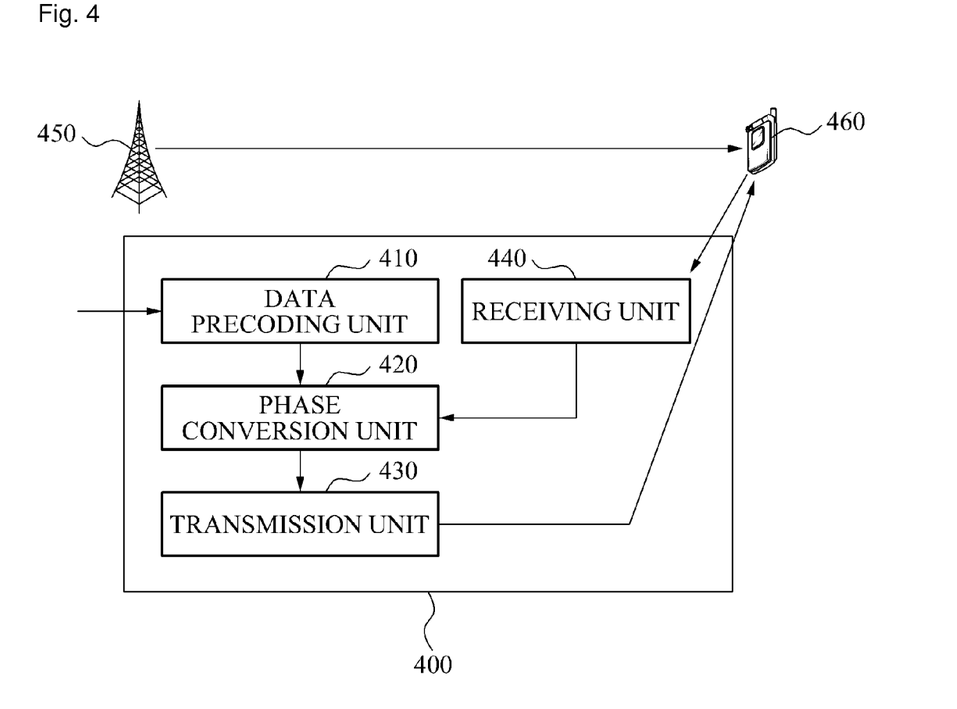
FIG. 4 is a block diagram illustrating a structure of a cooperative base station according to an embodiment of the present invention.

FIG. 4 is a block diagram illustrating a structure of a cooperative base station 400 according to an embodiment of the present invention.

The cooperative base station 400 may be located in a periphery of a serving base station 450. Thus, the cooperative base station 400 may transmit signals to a terminal 460 located within a coverage of the serving base station 450.

The serving base station 450 may precode transmission data to generate a first data vector. The serving base station 450 may transmit the first data vector to the terminal 460 using a transmission radio resource.

A data precoding unit 410 may precode the transmission data to generate the first data vector.

The data precoding unit 410 may precode the transmission data using a predetermined precoding scheme. The data precoding unit 410 may precode the transmission data using at least one of a space-time coding scheme and a space-frequency coding scheme.

Precoding results obtained by the data precoding unit 410 will be described detail with reference to FIGS. 2 and 3.

A phase conversion unit 420 may convert a phase of a first data vector to generate a second data vector. The phase conversion unit 420 may convert the phase of the first data vector using a diagonal matrix. The phase conversion unit 420 may convert the phase of the first data vector using multiplying the diagonal matrix by the first data vector.

According to exemplary embodiments of the present invention, diagonal elements of the diagonal matrix may have the same magnitudes as each other, and different phases from each other.

According to an embodiment of the present invention, the phase conversion unit 420 may convert the phase of the first data vector into another phase for each predetermined resource duration to generate the second data vector. That is, the phase of the second data vector may differ for each predetermined resource duration.

A transmission unit 430 may transmit the phase-converted second data vector to the terminal 460 using the transmission radio resource. That is, the first data vector and the second data vector may be transmitted to the terminal 460 using an identical radio resource. The transmission radio resource may include a specific time duration or a specific frequency band.

The terminal 460 may simultaneously receive the first data vector and the second data vector using the identical radio resource, and decode the transmission data using the received first data vector and second data vector.

The first data vector transmitted by the serving base station 450 may be phase-converted via a radio channel between the serving base station 450 and the terminal 460. Also, the second data vector transmitted by the cooperative base station 400 may be phase-converted via a radio channel between the cooperative base station 400 and the terminal 460.

When the first data vector and the second data vector are received from the terminal 460 while having an identical phase, the first data vector and the second data vector may construct each other, and thereby a strength of a reception signal of the terminal 460 may increase. Accordingly, the terminal 460 may receive data in success.

When the first data vector and the second data vector are received from the terminal 460 while having phases opposite to each other, the first data vector and the second data vector may destruct each other, and the terminal may not receive data.

The phase conversion unit 420 may convert the phase of the first data vector in a phase-conversion cycle faster than that of the radio channel to thereby generate the second data vector. In this case, the phases of the radio channel in a first resource duration and in a second resource duration may show almost no difference, however, phase-conversion values with respect to the first data vector in the first resource duration and the second resource duration may show a great difference.

In this case, even when the first data vector and the second data vector are received in the first resource duration while having phases opposite to each other, the first data vector and the second data vector may be received in the second resource duration while having an identical phase. Accordingly, even when the terminal 460 fails to receive data in the first resource duration, a terminal 470 may receive data in success in the second resource duration.

The terminal 470 may restore, when using an error correction receiving scheme such as a channel coding and the like, transmission data of the first resource duration of which the reception has ended in failure based on transmission data of the second resource duration of which the reception has ended in success.

The phase conversion unit 420 may randomly convert the phase of the first data vector for each predetermined resource duration regardless of a phase conversion value of each of the radio channels to generate the second data vector. Since the phase conversion value of each of the radio channels is unknown to the cooperative base station 400, even when the terminal 460 does not infer the phase conversion value of the radio channel, or even when the inferred phase conversion value is not fed back to the cooperative base station 400, the terminal 460 may receive data in success using a multiple cell cooperative communication.

According to another embodiment of the present invention, the cooperative base station 400 may convert the phase of the first data vector based on the phase conversion value of the radio channel between the cooperative base station 400 and the terminal 460.

The receiving unit 440 may receive, from the terminal 460, a phase of the radio channel between the cooperative base station 400 and the terminal 460, and the phase conversion unit 420 may determine the phase conversion value with respect to the first data vector with consideration of the phase of the radio channel.

According to an embodiment of the present invention, the transmission unit 430 may transmit a reference signal to the terminal 460, and the terminal 460 may infer the phase of the radio channel based on the reference signal.

Figure 5:
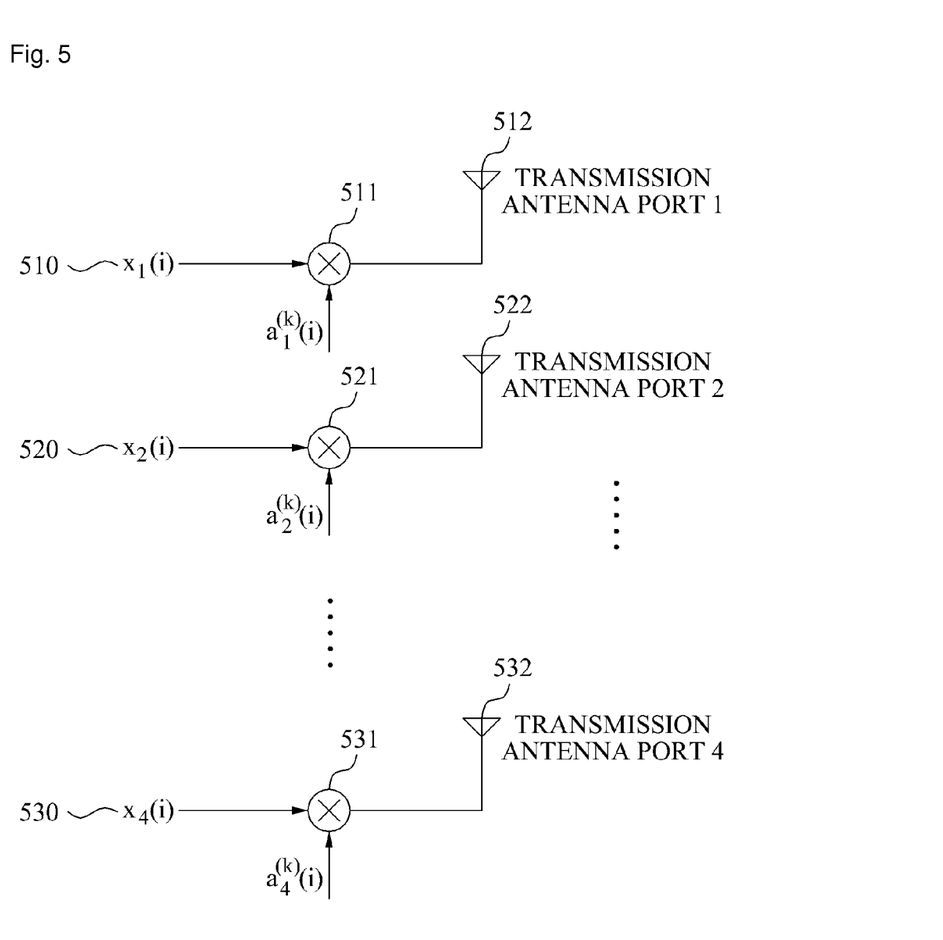
FIG. 5 is a block diagram illustrating a structure of a phase conversion unit according to an embodiment of the present invention.

FIG. 5 is a block diagram illustrating a structure of a phase conversion unit according to an embodiment of the present invention.

The phase conversion unit may convert a phase of each data vector depending on phase conversion values $$\alpha_1(i)(511), \alpha_2(i)(521), \ldots, \text{and } \alpha_4(i)(531)$$

with respect to respective data vectors $$x_1(i)(510), x_2(i)(520), \ldots, \text{and } x_4(i)(530).$$

According to an embodiment of the present invention, the phase conversion unit may determine the respective phase conversion values of which the magnitude is the same as to each other, and the phases are different from each other. In this case, the conversion unit may determine the magnitude of the respective phase conversion values as '1'.

According to an embodiment of the present invention, the phase conversion unit may randomly determine the phase conversion value. The phase conversion unit may determine the phase conversion value according to a predetermined phase conversion pattern, without a feedback of a channel phase from the terminal. In this case, data may be effectively transmitted even when the terminal does not feed back the channel phase to the base station, or even when the terminal does not accurately infer the channel phase.

According to another embodiment of the present invention, the phase conversion unit may determine the phase conversion value with consideration of the channel phase received from the terminal.

According to an embodiment of the present invention, the phase conversion unit may convert the phase conversion value wile transmitting a data vector. The phase conversion unit may periodically or non-periodically convert the phase conversion value.

The radio channel may be phase-converted over time. In this case, the phase conversion unit may convert the phase conversion value in a phase conversion speed faster than that of the radio channel. That is, during a predetermined time duration with an assumption that the channel phase is uniformly maintained, the phase conversion unit may convert the phase conversion value several times.

According to another embodiment of the present invention, the phase conversion unit may determine all of the phase conversion values as '1'. In this case, a magnitude of the data vector may be maintained as is, and a phase of the data vector may not be changed.

In particular, when the terminal is located in a specific cell boundary, the serving base station may determine all of the phase conversion values as '1', and maintain the phase of the first data vector as is to transmit the phase of the first data vector to the terminal. The cooperative base station may convert the phase of the second data vector to transmit the converted phase to the terminal.

The phase-converted data vectors may be transmitted using transmission antenna ports 512, 522, and 532.

Figure 6:
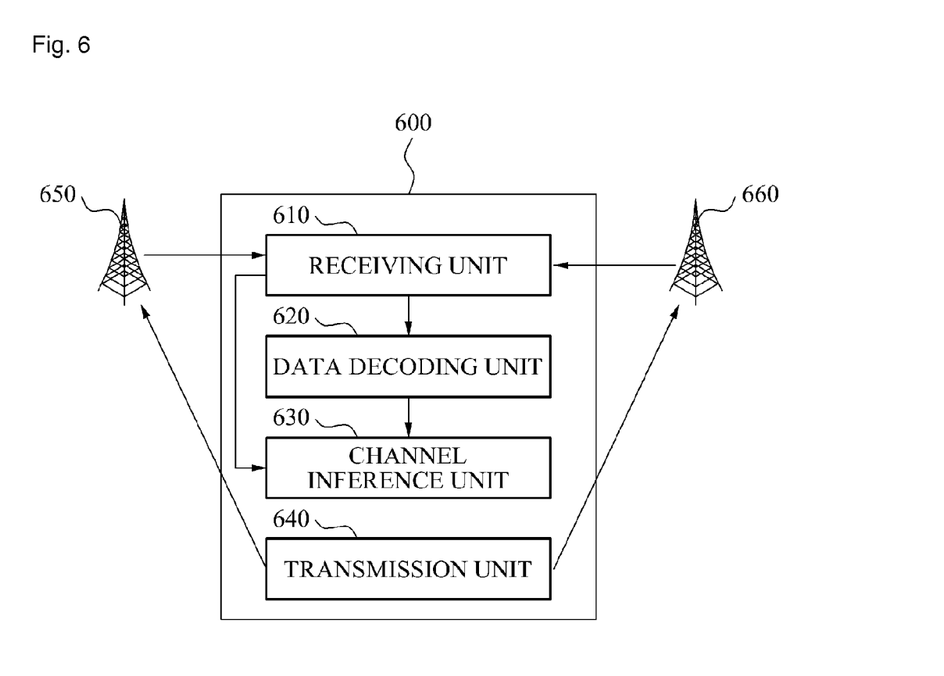
FIG. 6 is a block diagram illustrating a structure of a terminal according to an embodiment of the present invention.

FIG. 6 is a block diagram illustrating a structure of a terminal according to an embodiment of the present invention.

A receiving unit 610 may simultaneously receive a first data vector from a serving base station 650 and a second data vector from a cooperative base station 660. The serving base station 650 may precode transmission data to generate the first data vector, and the cooperative base station 660 may precode the transmission data to generate the first data vector. The cooperative base station 660 may convert the phase of the first data vector to generate the second data vector, and transit the second data vector to the terminal 660.

The receiving unit 610 may receive the first data vector and the second data vector using an identical time duration and an identical frequency band.

The first data vector may be phase-converted via a radio channel between the serving base station 650 and the terminal 600, and the second data vector may be phase-converted via a radio channel between the cooperative base station 660 and the terminal 600. Accordingly, the first data vector and the second data vector may construct each other to be received, or may destruct each other to be received.

The cooperative base station 660 may convert the phase of the second data vector into another phase for each predetermined resource duration. The cooperative base station 660 may convert the phase of the second data vector in a phase conversion cycle faster than that of the radio channel. In this case, the phase conversion values of the radio channel in the first resource duration and the second resource duration adjacent to the first resource duration may show almost no difference, however, the phase conversion values of the second data vector in the first resource duration and the second resource duration may show a great difference.

Accordingly, even when the first data vector and the second data vector destruct each other in the first resource duration, the first data vector and the second data vector in the second resource duration may reinforce each other to be received.

A data decoding unit 630 may simultaneously receive the first data vector and the second data vector, and decode the transmission data using the received first data vector and second data vector. When the first data vector and the second data vector reinforce each other to be received, the data decoding unit 630 may successfully decode the transmission data. When the first data vector and the second data vector destruct each other to be received, the data decoding unit 630 may not successfully decode the transmission data.

It is assumed that when the first resource duration and the second resource duration are adjacent to each other, an error may be created in the transmission data received during the first resource duration, and an error may not be created in the transmission data received during the second resource duration.

When using the error correction receiving scheme such as a channel coding and the like, the data decoding unit 630 may restore the transmission data of the first resource duration in which the error has been created, using the transmission data of the second resource duration of which the reception has ended in success.

As an example of the precoding scheme, at least one of a space-time coding scheme and a space-frequency coding scheme may be given. The data decoding unit 630 may decode the transmission data based on a coding scheme where the data vector is encoded.

When converting the phase of the second data vector regardless of the phase of the radio channel, the cooperative base station 660 may not need to know the phase of the radio channel. The terminal 600 may not need to feed back the phase of the radio channel to the cooperative base station 660.

Thus, according to an embodiment of the present invention, the terminal 600 may receive data using the multiple cell cooperative communication even when the phase of the radio channel is not fed back.

According to an embodiment of the present invention, a channel inference unit 630 may infer the phase of the radio channel with respect to the cooperative base station 660, and the transmission unit 640 may transmit the phase of the radio channel to the cooperative base station 660. The cooperative base station 660 may convert the phase of the second data vector based on the inferred phase of the radio channel.

According to an embodiment of the present invention, the receiving unit 610 may receive a reference signal from the cooperative base station 660, and the channel inference unit 630 may infer the phase of the radio channel based on the reference signal.

Hereinafter, an embodiment of the present invention in which the data decoding unit 620 combines the first data vector and the second data vector to decode the transmission data will be described in detail.

An embodiment in which the serving base station 650 and the cooperative base station 660 encode each data vector in a similar manner as that used in FIG. 2 will be herein described in detail, however, the present invention may be applicable in a similar manner as that used in FIG. 3. Also, for ease of description, only descriptions of the antenna ports 1 and 2 will be made, however, the present invention may be similarly applicable to the antenna ports 3 and 4.

Also, according to the above-described embodiments, only descriptions of one cooperative base station 660 to perform the multiple cell cooperative communication are made, however, the present invention may be applicable to a case where the multiple cell cooperative communication is performed using a plurality of cooperative base stations.

A first data vector generated through a precoding performed by a k-th base station may be expressed as $$x(i) = [x_1(i), x_2(i), \ldots, x_{N_{tx}}(i)]^T, i = 1, 2, 3, \quad \text{[Equation 1]}$$

wherein
$N_{tx}$
denotes a number of transmission antenna ports.

The k-th base station may convert a phase of the first data vector using a diagonal matrix
$D^{(k)}(i)$
of an
$N_{tx} \times N_{tx}$
-dimension in Equation 2, which is represented as $$y^{(k)}(i) = D^{(k)}(i)x(i). \quad \text{[Equation 2]}$$

According to an embodiment of the present invention, the diagonal matrix
$D^{(k)}(i)$
may be a diagonal matrix in which all remaining elements excluding diagonal elements have '0'.

That is, the diagonal matrix may be expressed, when the number of the transmission antenna ports is '2', as Equation 3, which is represented as $$D^{(k)}(2i+1) = D^{(k)}(2i+2) = \begin{bmatrix} \alpha_1^{(k)}(2i+1) & 0 \\ 0 & \alpha_2^{(k)}(2i+1) \end{bmatrix}, \quad \text{[Equation 3]}$$

$$i = 0, 1, \ldots .$$

The diagonal matrix may be expressed, when the number of the transmission antenna ports is '4', as Equation 4, which is represented as $$D^{(k)}(2i+1) = D^{(k)}(2i+2) = \quad \text{[Equation 4]}$$

$$\begin{bmatrix} \alpha_1^{(k)}(2i+1) & 0 & 0 & 0 \\ 0 & \alpha_2^{(k)}(2i+1) & 0 & 0 \\ 0 & 0 & \alpha_3^{(k)}(2i+1) & 0 \\ 0 & 0 & 0 & \alpha_4^{(k)}(2i+1) \end{bmatrix},$$

$$i = 0, 1, \ldots ,$$

wherein $\alpha_m^{(k)}(i), m = 1, 2, \ldots, N_{tx}$ denotes a complex number, and satisfies $\alpha_m^{(k)}(2i+1) = \alpha_m^{(k)}(2i+2), m = 1, 2, \ldots, N_{tx}$.

The cooperative base station 660 may convert the phase of the first data vector to generate the second data vector, and transmit the second data vector to the terminal. In this case, a phase of diagonal elements of a diagonal matrix may not be '0'. When magnitudes of the diagonal elements of the diagonal matrix are the same as each other, and phases thereof are different from each other, the cooperative base station 660 may select each element $\alpha_m^{(k)}(i), m = 1, 2, \ldots, N_{tx}$ of the diagonal matrix as $\alpha_m^{(k)}(i) = \exp[j2\pi\theta_m^{(k)}(i)], 0 \le \theta_m^{(k)}(i) < 1$.

According to an embodiment of the present invention, with a variation in a resource index, the cooperative base station 660 may convert a value of
$\alpha_m^{(k)}(i)$
to transmit the data vector.

The serving base station 650 may not convert the phase of the first data vector, and transmit the phase of the first data vector as is. That is, the serving base station 650 may determine the diagonal matrix as an identity matrix. According to an embodiment of the present invention, a serving base station may determine, from among a plurality of base station 650 and 660, the diagonal matrix as the identity matrix to transmit the data vector, and a cooperative base station may convert the phase of the data vector to transmit the data vector.

When transmission data
$s_{4i+1}$
and
$s_{4i+2}$
are precoded and transmitted using transmission antenna ports 1 and 2, a reception signal vector $r(i) = [r_1(i), r_1(i), \ldots, r_{N_{rx}}(i)]^T$ received by the terminal may be expressed as $$\begin{aligned} r(4i+1) &= \{h_1(4i+1)s_{4i+1} + h_2(4i+1)s_{4i+2}\} + \quad \text{[Equation 5]} \\ &\quad \{\alpha_1(4i+1)g_1(4i+1)s_{4i+1} + \\ &\quad \alpha_2(4i+1)g_2(4i+1)s_{4i+2}\} + n(4i+1) \\ &= \{h_1(4i+1) + \alpha_1(4i+1)g_1(4i+1)\}s_{4i+1} + \\ &\quad \{h_2(4i+1) + \alpha_2(4i+1)g_2(4i+1)\}s_{4i+2} + \\ &\quad n(4i+1) \\ &= h_{1,eff}(4i+1)s_{4i+1} + h_{2,eff}(4i+1)s_{4i+2} + \\ &\quad n(4i+1), \end{aligned}$$

and $$\begin{aligned} r(4i+2) &= \{-h_1(4i+2)s^*_{4i+2} + h_2(4i+2)s^*_{4i+1}\} + \\ &\quad \{-\alpha_1(4i+1)g_1(4i+2)s^*_{4i+2} + \\ &\quad \alpha_2(4i+1)g_2(4i+2)s^*_{4i+1}\} + n(4i+2) \\ &= -\{h_2(4i+2) + \alpha_2(4i+1)g_2(4i+2)\}s^*_{4i+1} + \\ &\quad \{h_1(4i+2) + \alpha_1(4i+1)g_1(4i+2)\}s^*_{4i+2} + \\ &\quad n(4i+2) \\ &= -h_{2,eff}(4i+2)s^*_{4i+1} + h_{1,eff}(4i+2)s^*_{4i+2} + \\ &\quad n(4i+2). \end{aligned}$$

The reception signal vector of Equation 5 may be expressed when it is assumed that the serving base station transmits the phase of the first data vector as is, not being converted, and the cooperative base station converts the phase of the first data vector to generate the second data vector and transmit the second data vector to the terminal.

Also, $$\alpha_m(4i+1)=\alpha_m(4i+2), m=1, 2$$

may be used.
$h_{1,\text{eff}}(i)$
and
$h_{2,\text{eff}}(i)$
of Equation 5 may be expressed as $$h_{1,\text{eff}}(i)=\{h_1(i)+\alpha_1(i)g_1(i)\}$$

$$h_{2,\text{eff}}(i)=\{h_2(i)+\alpha_2(i)g_2(i)\}. \quad \text{[Equation 6]}$$

In a case where a precoding is performed using the time-space coding scheme or the space-frequency coding scheme such as the Alamouti coding scheme, the data may be transmitted using a time duration and a frequency band, which are similarly located. Accordingly, a phase-difference of the radio channel due to antenna port and the time duration may be hardly performed as in Equation 7 below.

$$h_1(4i+1) \approx h_1(4i+2), h_2(4i+1) \approx h_2(4i+2)$$

$$g_1(4i+1) \approx g_1(4i+2), g_2(4i+1) \approx g_2(4i+2), \quad \text{[Equation 7]}$$

which satisfies Equation 8, which is represented as $$h_{1,\text{eff}}(4i+1) \approx h_{1,\text{eff}}(4i+2), h_{2,\text{eff}}(4i+1) \approx h_{2,\text{eff}}(4i+2). \quad \text{[Equation 8]}$$

In this case, to infer
$S_{4i+1}$,
$r(4i+1)$
and
$r(4i+2)$
may be combined as Equation 9 below, which is represented as $$\hat{s}_{4i+1}=h_{1,\text{eff}}(4i+1)^H r(4i+1)+h_{2,\text{eff}}(4i+2)^T r^*(4i+2) \approx \{\|h_{1,\text{eff}}(4i+1)\|^2+\|h_{2,\text{eff}}(4i+2)\|^2\}s_{4i+1}+ \{h_{1,\text{eff}}(4i+1)^H n(4i+1)+h_{2,\text{eff}}(4i+2)^T n^*(4i+2)\}. \quad \text{[Equation 9]}$$

Similarly, to infer
$S_{4i+2}$,
$r(4i+1)$
and
$r(4i+2)$
may be combined as Equation 10 below, which is represented as $$\hat{s}_{4i+2}=h_{1,\text{eff}}(4i+1)^H r(4i+1)-h_{2,\text{eff}}(4i+2)^T r^*(4i+2) \approx \{\|h_{1,\text{eff}}(4i+1)\|^2+\|h_{2,\text{eff}}(4i+2)\|^2\}s_{4i+1}+\{h_{1,\text{eff}}(4i+1)^H n(4i+1)-h_{2,\text{eff}}(4i+2)^T n^*(4i+2)\}. \quad \text{[Equation 10]}$$

In this instance, a Signal-to-Noise ratio (S/N) after combining
$r(4i+1)$
and
$r(4i+2)$
may be expressed as $$SNR_{multi,2} = \frac{\|h_{1,\text{eff}}(4i+1)\|^2 + \|h_{2,\text{eff}}(4i+2)\|^2}{\sigma_n^2} \quad \text{[Equation 11]}$$

$$= \frac{\|h_1(4i+1)+\alpha_1(4i+1)g_1(4i+1)\|^2 + \|h_2(4i+2)+\alpha_2(4i+1)g_2(4i+2)\|^2}{\sigma_n^2}.$$

In Equation 11, an S/N after combining
$r(4i+1)$
and
$r(4i+2)$
may be determined according to
$\alpha(4i+1)$
and
$\alpha(4i+2)$,
which are diagonal elements of a diagonal matrix. Accordingly, determining an optimal diagonal matrix to convert a phase of each data vector may influence a data transmission performance.

According to an embodiment of the present invention, the terminal may obtain an optimal value of $$\alpha_m(4i+1), m=1,2,$$

and transmit the optimal value to each of base stations. Each of the base stations may generate an optimal diagonal matrix with consideration of the transmitted $$\alpha_m(4i+1), m=1,2.$$

An embodiment in which the terminal obtains the optimal value with respect to $$\alpha_m(4i+1), m=1,2$$

may be given using Equation 12 below, which is represented as $$\alpha_{1,opt}(4i+1) = \arg\max_{\alpha_1(4i+1)} \|h_1(4i+1)+\alpha_1(4i+1)g_1(4i+1)\|^2 \quad \text{[Equation 12]}$$

subject to $|\alpha_1(4i+1)|=c_1$ $$\alpha_{2,opt}(4i+1) = \arg\max_{\alpha_2(4i+1)} \|h_2(4i+2)+\alpha_2(4i+1)g_2(4i+2)\|^2$$

subject to $|\alpha_2(4i+1)|=c_2$, wherein
$C_1$
and
$C_2$
denotes an arbitrary constant.

According to an embodiment of the present invention, the terminal may determine that the diagonal elements of the diagonal matrix have the same magnitude as each other and different phases from each other based on Equation 13 below, which is represented as $$\alpha_m^{(k)}(i)=\exp[j2\pi\theta_m^{(k)}(i)], 0 \leq \theta_m^{(k)}(i)<1. \quad \text{[Equation 13]}$$

According to another embodiment of the present invention, values of
$\alpha_m(4i+1)$
determined by the terminal may be determined in advance. It is assumed that a set of the values of
$\alpha_m(4i+1)$
is $$A_m=\{q_{m,1}, q_{m,2}, q_{m,3}, \ldots, q_{m,L_m}\}, m=1,2.$$

In this case,
$A_1$
and
$A_2$
may be the same or different. The terminal may obtain an optimal value of $\alpha_m(4i+1)$
within
$A_1$
and
$A_2$
based on Equation 14 below, which is represented as $$\alpha_{1,opt}(4i+1) = \arg\max_{\alpha_1(4i+1)\in A_1} \|h_1(4i+1) + \alpha_1(4i+1)g_1(4i+1)\|^2 \quad \text{[Equation 14]}$$

$$\alpha_{2,opt}(4i+1) = \arg\max_{\alpha_2(4i+1)\in A_2} \|h_2(4i+2) + \alpha_2(4i+1)g_2(4i+2)\|^2.$$

According to another embodiment of the present invention, the terminal may randomly obtain
$\alpha_m(4i+1)$
within
$A_1$
and
$A_2$,
and may select
$\alpha_m(4i+1)$
according to a predetermined rule.

The terminal may transmit an index of the selected
$\alpha_m(4i+1)$
to the base station, or may select
$\alpha_m(4i+1)$
according to the predetermined rule between the terminal and the base station.

According to another embodiment of the present invention, each of the base stations may change a value of each i while satisfying a condition of $$\alpha_m^{(k)}(4i+1) = \alpha_m^{(k)}(4i+2)$$

to thereby transit data. Each of the base stations may determine values of the diagonal matrix with consideration of the channel phase received from the terminal, or without consideration thereof.

It is assumed that
$\alpha_m^{(k)}(4i+1)$
may be simply expressed as
$\alpha_m(4i+1)$
in a case of one cooperative base station. When one value such as $$\alpha_1(4i+1) = \alpha_1(4i+2) = q_{m,1}$$

is used with respect to every i, in some cases, the value of
$\alpha_m(4i+1)$
may significantly reduce $$\|h_1(4i+1) + \alpha_1(4i+1)g_1(4i+1)\|^2.$$

In this case, a probability in which data transmission is ended in failure may be significantly high.

When the phase of the radio is slowly changed, a significantly small value may be repeatedly obtained with respect to several symbol index i. In this case, a probability in which every consecutive data transmission is ended in failure may be significantly high, and the data transmission performance may be significantly deteriorated although using a channel coding or an automatic repeat request (ARQ).

Accordingly, to prevent the above-described problems, when the cooperative base station applies the changed value per each i while satisfying the condition of $$\alpha_m(4i+1) = \alpha_m(4i+2),$$

the significantly small value of $$\|h_1(4i+1) + \alpha_1(4i+1)g_1(4i+1)\|^2$$

may be avoided from being repeatedly obtained with respect to the several symbol index i.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A mobile communication system, comprising:
    a serving base station precoding transmission data to generate a first data vector and transmitting the first data vector to a terminal; and
    a cooperative base station converting a phase of the first data vector to generate a second data vector and transmitting the second data vector to the terminal,
    wherein a phase of the second data vector is a different value for each predetermined duration with respect to at least one of a time and a frequency,
    wherein the phase of the first data vector is converted into another phase for each predetermined duration with respect to at least one of a time and a frequency to thereby generate the second data vector.

2. The mobile communication system of claim 1, wherein the phase of the first data vector is a different value for each predetermined duration with respect to at least one of a time and a frequency.

3. A terminal connected with a serving base station, the terminal comprising:
    a receiving unit to receive, from the serving base station, a first data vector generated based on transmission data, and to receive, from a cooperative base station, a second data vector generated by converting a phase of the first data vector; and
    a data decoding unit to decode the transmission data using the received first data vector and the received second data vector,
    wherein the phase of the first data vector is converted into another phase for each predetermined duration with respect to at least one of a time and a frequency to thereby generate the second data vector.

4. The terminal of claim 3, further comprising:
    a channel inference unit to infer a phase of a radio channel with respect to the cooperative base station; and
    a transmission unit to transmit the inferred phase of the radio channel to the cooperative base station,
    wherein a phase of the second data vector is converted based on the phase of the radio channel.

5. The terminal of claim 4, wherein the receiving unit receives a reference signal from the cooperative base station, and the channel inference unit infers the phase of the radio channel based on the reference signal.

6. The terminal of claim 3, wherein the receiving unit receives the first data vector and the second data vector using an identical time duration and an identical frequency band.

7. The terminal of claim 3, wherein the data decoding unit decodes the transmission data based on at least one of a space-time coding scheme or a space-frequency coding scheme.

8. The terminal of claim 3, wherein a phase of the second data vector is a different value for each predetermined duration with respect to at least one of a time and a frequency.

* * * * *